No. 839,919. PATENTED JAN. 1, 1907.
F. B. COOK.
CABLE CLAMP.
APPLICATION FILED OCT. 10, 1903.
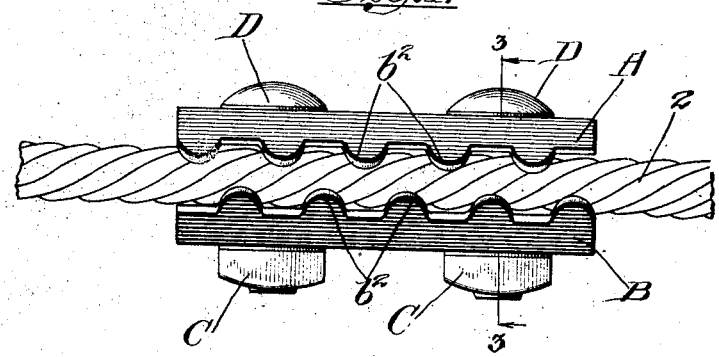
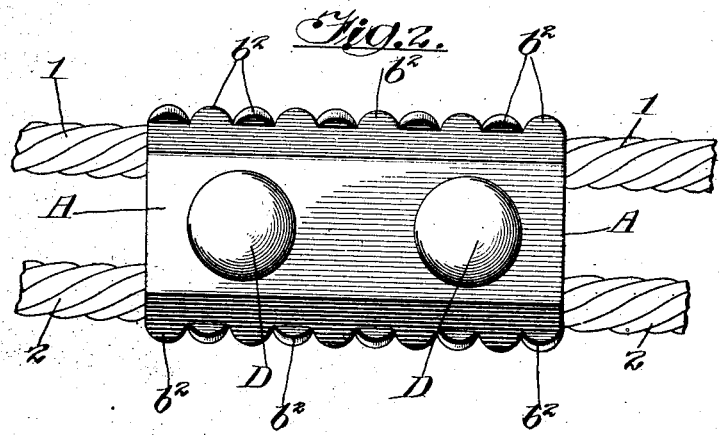
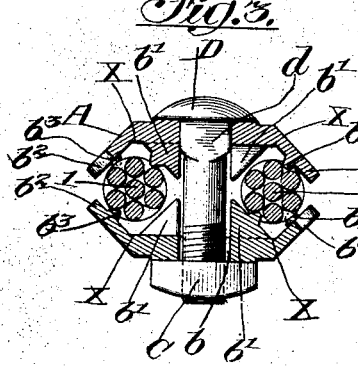
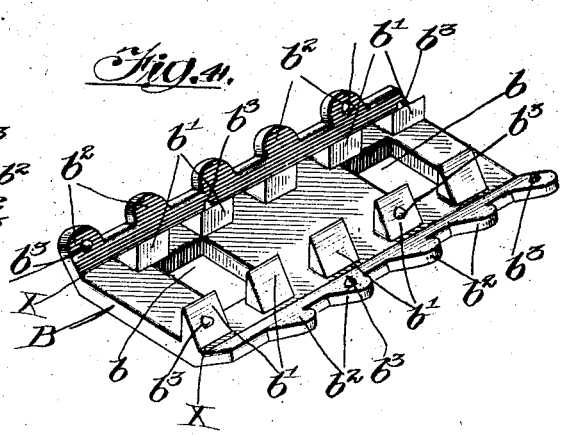
Witnesses:
Robert N Weir
M. Unmich
Inventor:
Frank B. Cook
By Bulkley & Durand
Attys

UNITED STATES PATENT OFFICE.

FRANK B. COOK, OF CHICAGO, ILLINOIS.

CABLE-CLAMP.

No. 839,919.	Specification of Letters Patent.	Patented Jan. 1, 1907.

Application filed October 10, 1903. Serial No. 176,457.

*To all whom it may concern:*

Be it known that I, FRANK B. COOK, a citizen of the United States of America, and a resident of Chicago, Cook county, Illinois, have invented a certain new and useful Improvement in Cable-Clamps, of which the following is a specification.

My invention contemplates an improved clamp of general utility.

More specifically considered, it is adapted more especially for use in clamping metallic cables—such as electrical conductors, &c.—and is of such character as to clamp upon a plurality of such cables.

It further contemplates an improved clamp of this character adapted to clamp upon and hold cables of different sizes or diameters.

The nature and advantages of my invention will, however, hereinafter more fully appear.

In the accompanying drawings, Figure 1 is a side elevation of a clamp constructed in accordance with the principles of my invention, the same being clamped upon a couple of parallel cables. Fig. 2 is a plan of the clamp and cables shown in Fig. 1. Fig. 3 is a vertical cross-section on line 3 3 in Fig. 1. Fig. 4 is a perspective view of one of the jaws or movable members of said clamp.

As thus illustrated my improved clamp comprises a pair of jaws or coöperating clamping members A and B, adapted to be drawn together by the action of the nuts C on the clamping-bolts D, which latter extend through the two jaws at points preferably midway between the cables 1 and 2. The jaw B is preferably formed with square openings $b$, adapted to receive the square portions $d$ of the said bolts, the polygonal formation preventing the latter from turning. The said jaw is also provided at each side of its longitudinal center line with an inner row of teeth $b'$ and also at a point each side of said line with an outer row of teeth $b^2$. As will be observed, the teeth $b'$ at one side of the jaw alternate relatively to the teeth $b'$ of the other side, and in a similar manner the teeth $b^2$ have a staggered or alternate arrangement relatively to the adjacent teeth $b^2$ at both sides of the jaw. Preferably certain of the teeth are provided on their inner faces with small projections $b^3$. The other jaw A can be a duplicate of the jaw B in every respect. When turned face to face, however, as illustrated, it will be seen that the teeth $b'$ of one jaw alternate or mesh with the like teeth of the other jaw, and in a similar manner the teeth $b^2$ of one jaw have a staggered or alternate arrangement relatively to the like teeth on the other jaw. In this way when the jaws are connected by the clamping-bolts the teeth of one jaw can be brought between the teeth of the other jaw, or the two jaws can be separated to an extent to separate the teeth, more or less, as shown in Figs. 1 and 3. In other words, the staggered arrangement of the teeth of one jaw relatively to the teeth of the other jaw permits of considerable variation in the size or diameters of the cables to be held. The jaws will clamp upon cables of quite small diameter fully as well and just as effectively as they will clamp upon and hold cables of larger diameter, and at this juncture it will be seen that the toothed formation of the jaws not only in itself insures a tight grip on the cables, but that this grip is made somewhat more effective by the presence of the sharp points $b^3$ on the inner surface of the teeth. These sharp points, together with the toothed formation of the jaw-faces, enable the clamp to securely hold the cables with considerably less pressure than would be the case were these features not present, although it will of course be understood that the clamp is of value and utility aside from the specific features and that these features—to wit, the toothed formation of the jaws and the sharp points—can be changed or modified in various ways without departing from the spirit of my invention.

The V-shaped clamping-grooves X are effective in gripping and holding the cables or other articles and permit of considerable variation in the size or diameter of the same. In addition the said grooves combine with the projections $b^3$ in insuring a more effective clamping action. These features—to wit, the V-shaped grooves and the sharp points—can of course be employed either separately and independently of each other or in combination, as illustrated.

I claim as my invention—

1. A cable-clamp comprising a pair of jaws, parallel rows of teeth on each jaw arranged to form parallel V-shaped channels thereon extending lengthwise of the clamp and adapted to receive the cables the teeth at one side of each channel alternating with the teeth at the other side thereof, and bolts or the like extending through the jaws between and in a line parallel with the said channels, to clamp the cables in the said channels.

2. A cable-clamp or the like, comprising a pair of jaws A and B, inner rows of teeth $b'$ $b'$ and outer rows of teeth $b^2$ $b^2$ on each jaw, all of the rows of teeth being parallel and extending lengthwise of the clamp, each inner row of teeth $b'$ and its corresponding outer row of teeth $b^2$ forming a V-shaped groove or channel adapted to receive a cable or the like, the inner teeth $b'$ for each channel alternating with the outer teeth $b^2$, and the teeth of each channel on one jaw alternating with the corresponding teeth on the other jaw, when the jaws are placed together, projections $b^3$ $b^3$ on the inner surfaces of the teeth $b'$ $b^2$ adapted to embed themselves in the cables, and bolts D D, or the like, extending through the jaws A and B midway between and in a line parallel with the said channels, to clamp the cables in the said channels.

Signed by me at Chicago, Cook county, Illinois, this 8th day of October, 1903.

FRANK B. COOK.

Witnesses:
A. F. DURAND,
WM. A. HARDERS.